April 24, 1951     E. M. BROWN ET AL     2,549,885
AGITATOR FOR DRINK MIXERS
Filed Sept. 19, 1949
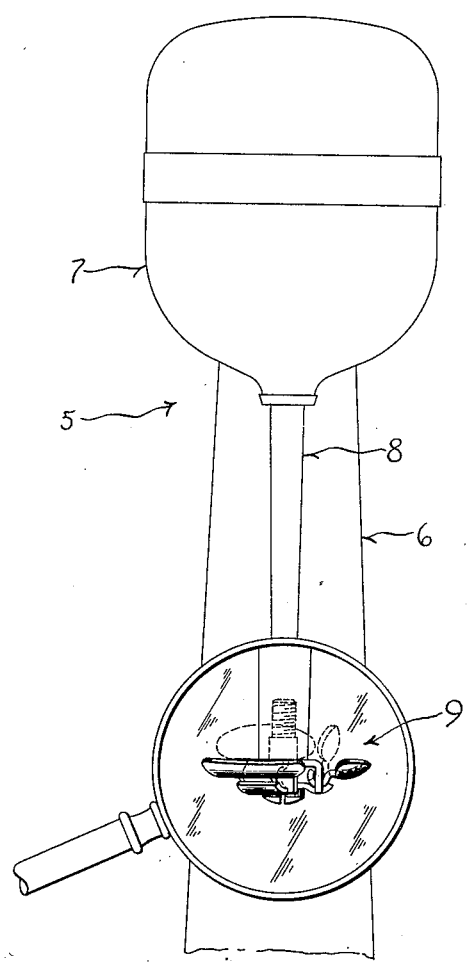
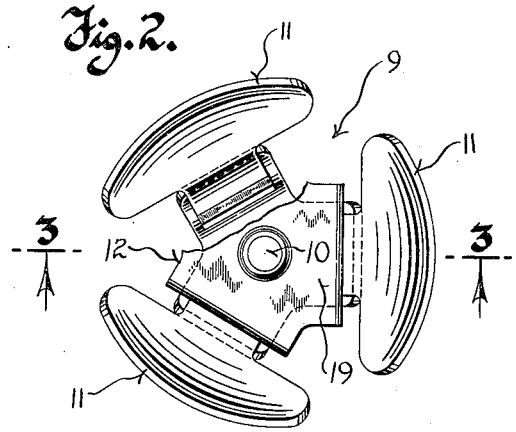
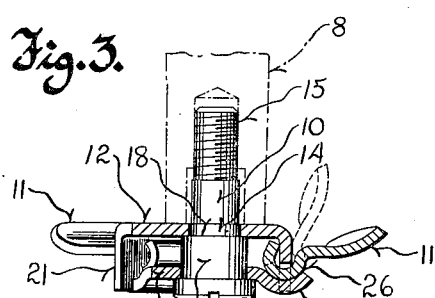
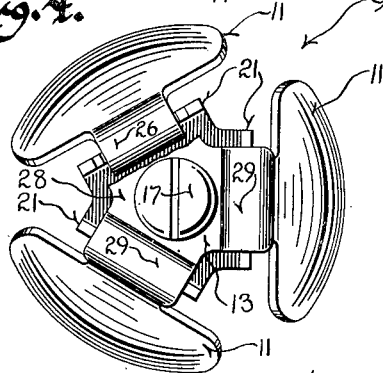
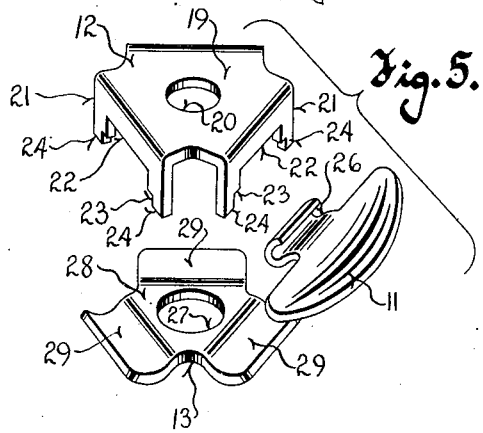
Inventors
Ellis M. Brown
Fritz Victor Forss Patented Apr. 24, 1951

2,549,885

UNITED STATES PATENT OFFICE 2,549,885

AGITATOR FOR DRINK MIXERS

Ellis M. Brown and Fritz Victor Forss, Racine, Wis., assignors to John Oster Manufacturing Company, Racine, Wis., a corporation of Wisconsin Application September 19, 1949, Serial No. 116,581

5 Claims. (Cl. 259—135)

This invention relates to mixers of the type used for mixing drinks containing ice cream, and refers more particularly to agitators for such mixers.

Drink mixers of this type are provided with a relatively long, slender drive or mixer shaft, adapted to extend down into the material being mixed, and this shaft has heretofore had one or more rigid agitator discs secured thereto. These agitator discs were relatively small in diameter, and in fact were only slightly larger than the diameter of the rotatable mixer shaft, to facilitate passing the agitators through the ice cream in the mixer cup when the latter was moved into its position of use beneath the mixer, and they were usually crimped in some way so that upon rotation with the shaft they were able to effect blending and some aeration of the liquid and the ice cream being mixed.

While insertion of the mixer shaft and agitators into the ice cream was to some extent facilitated by making the mixers with a relatively small diameter, such quick and easy insertion of the mixer had to be achieved at the expense of mixing efficiency.

It is, therefore, an object of this invention to provide an improved agitator for a drink mixer which will more completely and efficiently blend the semi-solid ingredients and liquids of a mixed drink, while at the same time enabling the agitator to be quickly and easily insertable into the ingredients of a drink to be mixed.

Another object of this invention is to provide an agitator of the character described having blades which will be automatically retracted in consequence to insertion of the agitator into the ingredients of the mixer cup so that the mixer may be quickly passed through the semi-solid ice cream in the cup to permit the same to be moved to its position of use with a minimum of delay, and which blades will automatically extend to an efficient mixing position after the cup is in place.

A further object of this invention resides in the provision of an agitator of the character described having blades mounted for pivotal retracting and extending motion about a fixed pivot and in which the pivot connections will not tend to become clogged by semi-solid matter being mixed, which would otherwise preclude extension of the blades.

Still another object of this invention is to provide a simple and inexpensive agitator of the character described, having a relatively small number of parts which may be easily manufactured and assembled.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a front elevational view of a drink mixer with the agitator end of the drive shaft magnified to more clearly show the agitator of this invention;

Figure 2 is a plan view of the agitator per se with the blades in their extended or operative positions;

Figure 3 is a longitudinal sectional view of the agitator taken on the plane of the line 3—3 in Figure 2;

Figure 4 is a bottom view of the agitator with the blades in their operative position; and Figure 5 is a separated perspective view of the hinge and retaining plates and one of the agitator blades, showing the same in their respective positions prior to assembly to the agitator mounting screw.

Referring now particularly to the accompanying drawing in which like numerals indicate like parts throughout the several views, the numeral 5 designates generally a drink mixer of the type here under consideration. The mixer has the usual upright standard 6, and an electric motor 7, by means of which the mixer is powered, is mounted on the top of the standard. Projecting downwardly from and driven by the motor is a rotatable drive or mixer shaft 8, having the agitator 9 of this invention secured at its lower free end.

The agitator 9 is a unitary subassembly comprising a bolt 10 by means of which the agitator is secured to the lower end of the drive shaft 8 for rotation therewith, a plurality of blades 11, and upper and lower supporting plates 12 and 13, respectively, which cooperate to mount each blade for pivotal motion about a fixed horizontal axis. The bolt 10 is provided with an intermediate shank portion 14 inwardly of and slightly larger in diameter than its outer threaded end portion 15 but smaller in diameter than the outer shank portion 16 which connects with the enlarged head 17 of the bolt. Thus, the junction between the shank portions 14 and 16 forms an annular shoulder 18 on the bolt a distance inwardly of its head.

The upper support or hinge plate 12 has a substantially triangular main body portion 19 provided with a central aperture 20 through which the intermediate shank portion 14 is adapted to be press fitted. When in place on the bolt the body portion 19 rests on the shoulder 18 and lies in a plane substantially normal to the axis of the bolt 10.

A plurality of equispaced short, wide arms 21, in the present instance three, are bent downwardly from the straight sides of the body portion 19 of the hinge plate 12, projecting at right angles from its periphery a distance slightly less than the length of the outer shank portion 16 of the bolt. Each arm has an inner notch 22 opening to its outer extremity through a wider outer notched portion 23, so that the two notches together define laterally spaced steps flanked by lugs.

An agitator blade 11 is carried on the end of each of the arms 21. Each of the blades 11 is slightly concave or upwardly dished in cross section and has a hook-like socket portion 26 extending from its inner side edge. The width of this socket portion is substantially equal to that of the inner notch 22 in the arm, and it is curved upwardly and rearwardly to a U-shape so as to permit it to be received in the inner notch 22 of an arm and loosely curled or hooked about the arm portion inwardly of the notch as best seen in Figure 3. The blades 11 and their socket portions 26 have a uniform thickness which is slightly less than the depth of the inner notches 22 to permit the blades to freely pivot about the fulcrums provided by the bottoms of the notches 22.

While the abutments provided by the sides of the notches 22 largely prevent sidewise movement or displacement of the blades relative to the arms, the lower supporting or retaining plate 13 precludes detachment of the blades from the arms in the direction of the mixer shaft axis, and thus maintains their pivotal connections with the arms 21. The retaining plate 13 has a substantially triangular body 28, somewhat smaller than the body of the hinge plate, with a central aperture 27 therein of a size to receive the large outer shank portion 16 of the bolt 10, so that the body 28 rests on the underside of the head 17 of the bolt. A tongue 29 extends outwardly from each side edge of the body 28, and these tongues have a width substantially equal to that of the outer notches 23 and are concavely curved so as to conform in shape to the outer surfaces of the hooks on the agitator blades.

Each of the tongues 29 is received in the outer notch 23 of one of the arms 21 and cooperates therewith to hold the blades in place and guide them for pivotal motion about the ends of the arms. Since the inner notches in the arms 21 have slightly greater depth than the thickness of the hooks, the tongues are prevented from clamping the hinge hooks against their fulcrums by the steps at the opposite ends of the outer notches.

Since the upper support plate 12 is press fitted onto the intermediate shank portion 14 of the bolt 10 the lower plate 28 is secured against axial displacement on the bolt by the head of the latter and by the outer notch portions 23 on the arms 21 of the upper plate. It follows that the hooks or socket portions 26 on the blades will likewise be retained against radial displacement when the upper plate is pressed into place, so that the entire agitator assembly, consisting of the upper and lower plates, blades, and bolt, can be handled as a single part. Insertion and tightening of the bolt in a suitably threaded coaxial well in the bottom of the mixer shaft 8 establishes a good driving connection between the upper surface of the upper hinge plate and the lower end of the shaft.

Referring to Figure 3 it will be seen that the blades are capable of swinging upwardly through an arc of approximately ninety degrees, from operative, extended, substantially horizontal positions to inoperative positions alongside the shaft and nearly parallel with its axis, the limits of such motion being defined by the engagement of the opposite legs of the U shaped hook portions with the opposite surfaces of the arms embraced by the hook portions.

Thus when the agitator is passed into the solid or semi-solid ingredients of a drink to be mixed, as the mixing cup is moved into its operative position below the motor, the blades will swing upwardly to their retracted position in response to the force imposed upon them by the ice cream or other semi-solids through which they are being pushed, and they will therefore enter such material substantially edgewise, offering very little resistance to insertion of the shaft into the mixing vessel. After the cup is in place, centrifugal force created by the usual high speed rotation of the shaft 8 will swing the blades downwardly and outwardly to their extended and fully operative positions, normal to the axis of the shaft, in which positions the blades effect most efficient beating and mixing.

Since the blades always enter the ingredients in an edgewise or retracted attitude, the working surfaces of the blades may be made larger than those heretofore employed and only a single agitator at the end of the drive shaft is required.

Because of the high speed of rotation of the mixer shaft 8 and because the blades of the agitator pivot about fixed fulcrums, the danger of the blades "cocking" during retracting or extending swinging movement is completely eliminated. Attention is also directed to the fact that the pivotal connection employed on the agitator blades of this invention obviates the need for a pivot pin or shaft to mount the blades for swinging motion, and additionally affords easy access to all surfaces of the agitator for cleaning.

From the foregoing description, taken in connection with the accompanying drawing, it will be readily apparent that this invention provides a simple and inexpensive agitator for drink mixers which will readily pass through the semisolid ingredients of a mixed drink as the mixer cup is moved up into its operative position and which will mix such drinks quickly and efficiently.

What we claim as our invention is:

1. In an agitator for the drive shaft of a drink mixer: a pair of superimposed plate members; a plurality of arms on one of the plate members extending to one side thereof toward the other plate member, each of the arms having spaced lugs adjacent to its opposite side edges abutting the adjacent side of the other plate member to hold the plate members spaced apart, and a fulcrum-like edge portion extending between said lugs parallel to said first designated plate member and facing said side of the other plate member but spaced therefrom; a plurality of blades, one for each arm; and a pivotal connection between each blade and its arm constraining the blade to swinging motion from an extended position substantially parallel with said first plate member to a retracted position substantially perpendicular to said first plate member about an axis parallel to said first designated plate member, comprising a U-shaped hinge part on the blade having substantially parallel spaced apart legs disposed at opposite sides of and loosely embracing the outer end of its arm, the bight of the hinge part being hooked over said fulcrum-like edge portion of the arm and passing freely between said fulcrum-like edge portion and the adjacent surface of the other plate, between the lugs on the arm, and said other plate extending radially beyond the fulcrum-like edge portion and by engagement with the convex outer surface of the bight of the U-shaped hinge part cooperating with said fulcrum-like edge portion of the arm to constrain the blade to swinging movement about said edge portion of the arm.

2. The agitator set forth in claim 1, wherein the bight confining portions of said other plate member are curved to conform to the convex curvature of the outer surfaces of the bights so as to guide the blades for swinging motion about said fulcrum-like edge portions on the arms.

3. An agitator for stem-type drink mixers having a power driven rotatable agitator stem, comprising: a pair of plate members secured to the stem in spaced parallel relation with the planes thereof normal to the axis of the stem; a plurality of arms on one of the plate members extending therefrom towards the other plate member and each having an edge facing and parallel to said other plate member but spaced therefrom; a plurality of blades, one for each arm; a pivotal connection between each blade and its arm mounting the blade thereon for swinging motion about said edge of its arm, comprising a hook-like socket portion on the blade, U-shaped in cross section so as to have substantially parallel legs, said socket portion loosely embracing the arm with the legs of the U-shaped socket portion straddling said edge of the arm and the outer convex surface of the bight of the socket portion engaging said other plate member so that said other plate member holds the socket portion on its arm; and abutments on one of said plate members engageable with adjacent portions of the blades for holding the blades against edgewise displacement off their respective arms.

4. The agitator set forth in claim 3 wherein said other plate member is provided with concave portions engaging over the convex outer surfaces of the bights on the hinge parts and cooperating with said end portions of the arms to constrain the blades to swinging motion about axes fixed with relation to the arms.

5. In a drink mixer of the type having an elongated vertical rotatable mixer shaft and an agitator at the bottom of said shaft having hinged blades which are automatically extensible in response to centrifugal force due to rotation of the mixer shaft, from a substantially vertical position adjacent the mixer shaft to a substantially horizontal position lying in a plane normal to the axis of the mixer shaft, hinge means for said blades comprising: a hinge plate secured at the bottom of the mixer shaft for rotation therewith and having a plurality of downwardly turned portions on its periphery, one for each blade, equidistant from one another and from the axis of the mixer shaft; a hook-like socket portion projecting from the inner edge of each blade, substantially U-shaped in cross section and embracing the bottom edge of one of the downwardly turned portions on said plate; a retaining plate secured below said hinge plate for rotation with the mixer shaft and having portions disposed below the bottom edges of said downwardly turned portions and engaging the outer convex surfaces of the bights of said U-shaped socket portions to hold the same engaged with the downwardly turned portions on the hinge plate while leaving the socket portions free for swinging motion through an arc defined by collision of the legs of the U-shaped socket portions with the opposite sides of the downturned portions of the hinge plate; and pairs of abutments on one of said plates, each of said pairs of abutments being disposed at opposite sides of one of said socket portions to preclude displacement of the same in the direction of its hinge axis.

ELLIS M. BROWN.
FRITZ VICTOR FORSS.

REFERENCES CITED

The following references are of record in the file of this patent:

UNITED STATES PATENTS

| Number | Name | Date |
|---|---|---|
| 1,227,671 | Robertson | May 26, 1917 |
| 1,644,878 | Ellis | Oct. 11, 1927 |
| 2,254,236 | Myers | Sept. 2, 1941 |